Dec. 9, 1969      B. J. GLADWYN      3,482,433
FLUID-OPERATED SENSING SYSTEM
Filed Sept. 16, 1966      2 Sheets-Sheet 1

INVENTOR
BURCHELL J. GLADWYN
By Shoemaker and Mattare
ATTYS.

Dec. 9, 1969  B. J. GLADWYN  3,482,433
FLUID-OPERATED SENSING SYSTEM
Filed Sept. 16, 1966  2 Sheets-Sheet 2
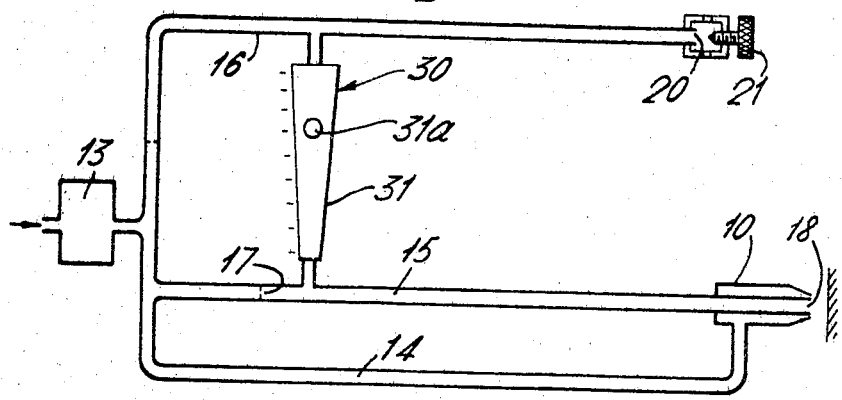
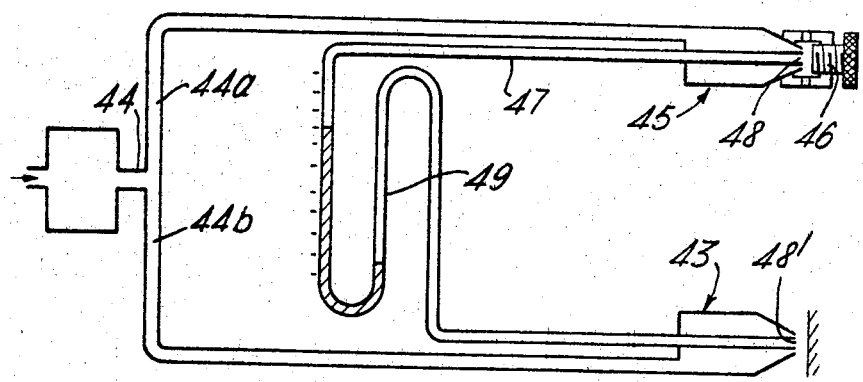
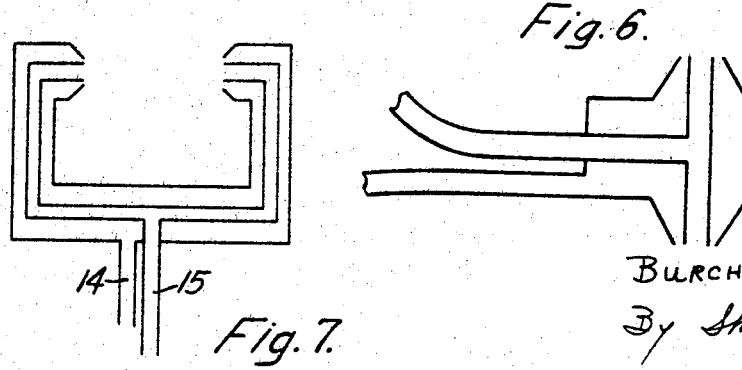
INVENTOR
BURCHELL J. GLADWYN
By Shoemaker and Mattare
Attys.

United States Patent Office 3,482,433
Patented Dec. 9, 1969

3,482,433
FLUID-OPERATED SENSING SYSTEM
Burchell J. Gladwyn, Broadstone, Dorset, England, assignor of one-half to Robert G. Lane, Dorset, England
Filed Sept. 16, 1966, Ser. No. 580,058
Claims priority, application Great Britain, Sept. 24, 1965, 40,813/65
Int. Cl. G01b *13/08*
U.S. Cl. 73—37.5          10 Claims

ABSTRACT OF THE DISCLOSURE

This invention relates to a fluid operated gauge for indicating the degree of proximity of a workpiece to a nozzle part of the gauge from which issues a jet of fluid which strikes the workpiece. The nozzle comprises a duplex nozzle having a first orifice arranged to emit a jet of fluid coaxial with and surrounding a second orifice emitting a second jet of fluid. The first jet of fluid forms a high pressure sleeve for containing the flow of low pressure fluid from the second nozzle. Variation in the spacing between the workpiece and nozzle varying a parameter of the fluid supplied to the second orifice and means is provided for sensing the change in parameter of the fluid supplied to the second orifice.

---

This invention relates to fluid-operated sensing systems, and particularly to pneumatic sensing systems in which the presence, absence or proximity of some impedance adjacent to a nozzle, from which issues a flow of gas which impinges on the impedance, is sensed pneumatically. The invention chiefly relates to such sensing systems adapted to serve as so-called "air gauges," that is gauges of the type in which a flow of air emerging from an orifice impinges on a workpiece or other surface, and in which the variation of the impedance offered to the flow by the workpiece is used to indicate the proximity of the workpiece to the nozzle.

A known air gauge uses a single nozzle from which issues a jet of air or other gas. Variation of the impedance presented to the jet by an adjacent workpiece causes the pressure or rate of flow of the air in the conduit leading to the nozzle to vary. These variations of pressure or rate of flow are measured by a manometer or flowmeter to give a measure of the changes in distance between the nozzle and workpiece.

The primary disadvantage of this known air gauge is that it is effective only up to a separation distance of 0.006″.

Accordingly the present invention aims at providing a fluid-operated sensing system of the air gauge type in which the variation of a parameter of the fluid in a secondary system adjustably coupled to the primary system producing the jet of fluid is used to increase the sensitivity of the systems over much greater distances between the nozzle and workpiece.

In order that the invention may be better understood several embodiments thereof will now be described with reference to the accompanying diagrammatic drawings in which.

Figure 3:
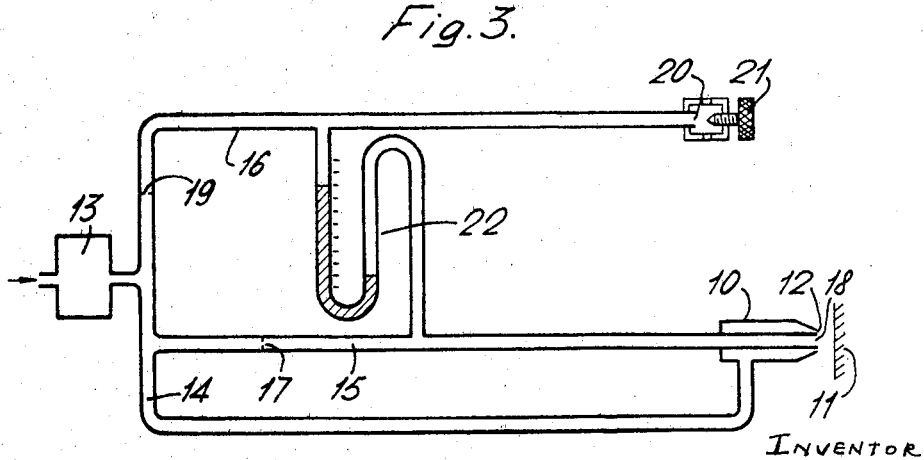

FIGURES 3, 4, and 5 are diagrams of typical sensing circuits of the invention;

FIGURE 6 illustrates diagrammatically an alternative nozzle; and

FIGURE 7 illustrates another form of the embodiment showing two duplex nozzles directed toward each other.

Figure 1:
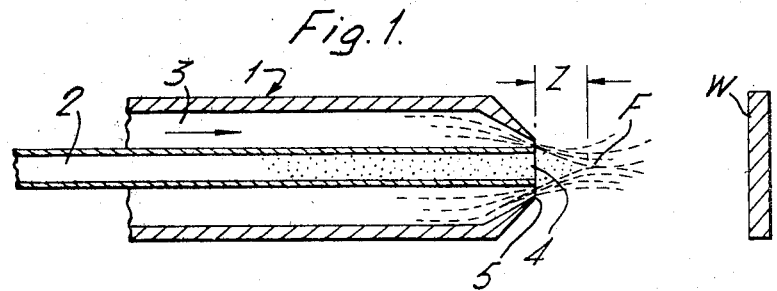
FIGURE 1 is an axial cross-section through one form of duplex nozzle assembly employed in the sensing system of the present invention.

In FIGURE 1 there is shown a duplex nozzle 1 comprising two coaxial inner and outer conduits designated 2 and 3 respectively, the inner conduit 2 terminating at an orifice 4 concentric with an annular orifice 5 at the end of the outer conduit 3. The shape of the conduit 3 as it approaches the orifice 5 is such as to direct the gas issuing from orifice 5 into a convergent conical jet, the apex of the jet being at a focus region F on, or near, the nozzle axis. When conduit 3 of the nozzle is connected to a source of pressure gas so that the gas discharges through orifice 5, the discharge influences the pressure of the gas in the conduit 2. The extent of this influence varies in accordance with the impedance to the jet by an adjacent workpiece, as more fully explained below.

The value of the impedance can be related directly to the reading of a pressure or flow-rate indicator incorporated in the conduit 2, for example a fluid manometer, pneumatic flow-meter or mechanical-electrical transducer. Alternatively a transducer responsive to a change in a parameter, e.g. pressure or flow-rate, of the conduit 2 may be arranged to operate, through a mechanical or electrical servo-mechanism, a control system for operating a machine-tool, for example.

When a workpiece W is brought into the vicinity of the focus F of the convergent jet issuing from the annular nozzle 5, the impedance presented by the workpiece to the jet alters the effect that this jet has upon a parameter of the gas in the conduit 2. Thus, as the focussed jet passes over the orifice 4 of the inner conduit 2, it causes a reduction of the pressure within the inner conduit 2, which reduction is detectable upstream of orifice 4. As the workpiece reaches and passes through the focus F towards the nozzle this reduction in pressure is lessened. This pressure rise will continue steadily as the workpiece is moved closer to the orifice until the venturi effect of the focussed jet on the gas in conduit 2 is no longer evident, after which point the workpiece merely deflects some air issuing from the annular orifice 5 into the inner conduit 2 causing a still further pressure rise (the so-called "deflected pressure effect") until eventually the pressure within the conduit 2 practically reaches that obtaining at the annular orifice 5.

Figure 2:
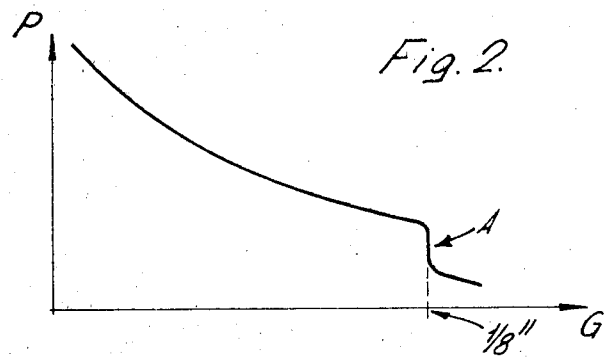
FIGURE 2 is a typical graph indicating the change of pressure in the central conduit of the nozzle of FIG. 1 with distance of a workpiece from the nozzle.

FIGURE 2 is a typical graph showing how the inner conduit pressure (ordinate) changes with changes in the length of the gap (abscissa) between the workpiece and the orifices 4 and 5. At the position of the workpiece which causes a changeover from the so-called venturi effect to the deflected pressure effect, there is a sharp increase in pressure, which occurs at a distance A from the nozzle. This distance A is a characteristic of the nozzle and gas parameters. This pressure rise can be many inches water gauge at a distance of about ⅛ inch from the orifices.

As the workpiece is moved closer still to the orifice a still further proportion of the gas from the orifice 5 is deflected by the workpiece into the conduit 2 and the pressure within the latter rises. This rise continues as the workpiece is moved progressively nearer the orifice, the pressure in the conduit 2 gradually approaching the supply pressure in path 3.

The sensitive zone created by the conical jet from the nozzle described above extends to a distance beyond the nozzle exit many times that which is obtainable by conventional jets. For example, conventional jets are normally limited to a working range of about 0″ to 0.006″ between workpiece and jet, whereas the jet described above can operate over a range in excess of 0.180″. Moreover experiments have shown that the supply pressure in conduit 3 can be as low as 0.5 p.s.i. while still giving useful responses in conduit 2 over relatively wide gaps between nozzle and workpiece, whereas using conventional jets relatively high pressures are necessary to give useful responses over much smaller gaps. The scale of magnification indicated by the pressure or flow-rate indicator incorporated in the system can be varied substantially by adjusting the position of the nozzle relative to the workpiece, or by varying the supply pressure, or by a combination of both.

Referring now to the system shown in FIGURE 3, the duplex nozzle 10 of FIGURE 1 is shown applied to an air gauge which senses the proximity to the nozzle of a workpiece 11 by virtue of the impedance the workpiece presents to the flow of air from the annular orifice 12. In this example, air is supplied from a flow regulator 13, wherein the pressure is stabilised, into three lines 14, 15, and 16 in parallel. The line 14 is connected directly to the outer conduit of the nozzle 10 communicating with the annular orifice 12, while the line 15 communicates the pressure air, via a restrictor 17, with the inner conduit of the nozzle 10 terminating in orifice 18 within the annular orifice 12. The third line 16 also contains a similar restrictor 19 and directs the pressure air to a zeroing orifice 20. The latter is an orifice similar to orifice 18 but arranged so that its discharge area can be restricted by an adjustable screw 21. The parts of lines 15 and 16 between the restrictors 17 and 19 and their discharge orifices 18, 20 are connected to the opposite ends of a manometer tube 22. To set up the instrument, the pressure air is supplied to all three lines 14, 15 and 16 and, with no workpiece in the vicinity of the nozzle 10, the adjusting screw 21 is moved to produce a zero reading on the manometer tube 22. As the nozzle 10 is approached by the workpiece 11, an impedance is presented to the jet which emerges from the orifice 12. As the workpiece impedes the flow of the jet the pressure in line 15 is affected generally in accordance with the characteristic curve of FIGURE 2 and hence by measuring the pressure difference the distance between orifice 12 and the workpiece can be gauged.

It will be appreciated that if a plurality of manometers with fluids of different specific gravity are placed in parallel between lines 15 and 16 simultaneous readings at different magnifications will be achieved.

A modified form of the air gauge of FIGURE 3 is shown in FIGURE 4 in which the parts similar to those shown in FIGURE 3 bear the same reference numbers. The gas parameter monitored is not pressure but flow rate, and to this end a flowmeter 30 replaces the manometer tube of FIGURE 3. After passing the pressure-dropping restrictor 17, the air in line 15 can pass through both the central orifice 18 of the nozzle 10, and the flowmeter 30 into line 16. The proportion of the air flowing through the flowmeter 30 will depend upon the proximity of the workpiece 11 to the jet orifice 18. The line 16 offers the facility of zeroing the float 31a in the flowmeter tube, and at the same time enables adjustments to be made in the position of the zeroing screw in order to minimise the effects of small variations in air supply pressure.

It will be appreciated that if a plurality of flowmeters with different scale or float characteristics are connected in series with each other between lines 15 and 16 simultaneous readings at different magnifications will be achieved.

This arrangement is well suited as the basis of a self-contained portable gauging unit with its own compressor providing the necessary air supply.

Referring now to FIGURE 5 there is shown a gauge modified to operate with a pressure-sensing manometer as in FIGURE 3 but with a negative pressure in the inner conduit of the nozzle. The gauge comprises two duplex nozzles 43, 45 and a bifurcated air line 44 each leg 44a, 44b of which leads to the outer conduit of a nozzle as shown in FIGURE 1. One of these nozzles is the sensing nozzle 43, and the other is a zero-set nozzle 45. The zero-set nozzle 45 incorporates a dummy workpiece in the form of a zero adjustment screw 46, so that a given impedance is presented to the flow through nozzle 45 to allow a datum level to be established in the parameter-measuring circuit 47.

The second circuit 47 terminates at both ends in orifices 48, 48', and is coupled into the first circuit 44 in a manner such that the degree of coupling is dependent upon the proximity of the workpiece W to the nozzle 43. Otherwise expressed, the air which flows through the legs 44a, 44b of the first circuit and is discharged through the nozzles 48, 48' produces a pressure reduction in the second circuit which is varied to a degree which depends on the proximity of the workpiece, and hence measurement of the pressure difference between the ends of circuit 47 enables the proximity of the workpiece to nozzle 43 to be measured. A manometer tube 49 in the second circuit between the nozzles provides an indication of the pressure difference and hence, when suitably calibrated, of the proximity of the workpiece.

This system is operated over a range of gaps such that there is a pressure reduction induced in the inner conduit of each nozzle.

The gauges described above are applicable to conventional modes of air gauging and they provide the advantage that the proximity of the workpiece can be measured over a greater air gap than has hitherto been possible.

The advantages of the present invention can also be obtained by mounting two or more duplex nozzles in such a manner that they can be used for gauging the distance between two or more surfaces acting concurrently as an impedance to the flow of gas from the nozzles.

In a preferred form of this embodiment two duplex nozzles are used with their jets coaxial and directed either away from, or towards, each other for measuring respectively say the inner diameter or the outer diameter of a cylindrical body acting as an impedance common to both nozzles.

In this arrangement the outer and inner conduits of both nozzles are connected to separate common conduits which are then connected in a sensing system in the same manner as pipes 14 and 15 shown in FIGS. 3 and 4, the coupled nozzles taking the place of a single duplex nozzle.

The distance being measured is made up of the distance between the orifices of the nozzles, which can be determined conventionally, plus the lengths of the gaps between the nozzles and the workpiece, which are measured by the system of this invention. Such a coupled nozzle is shown in FIG. 6.

Within limits nozzles coupled in this manner can be arranged to compensate differentially for each other, so that the two gaps in effect are regarded by the system as a single gap, and measured as such, without the nozzles being exactly equidistant from the workpiece.

The range over which the coupled nozzles will cooperate differentially is greatly in excess of that which is possible using coupled conventional jets.

It will be appreciated that the nozzle described in FIGURE 1 can be incorporated in any devices for internal or external gauging, by impingement of the gas jets either directly on the surfaces being measured, or indirectly through mechanisms inserted between the surfaces being measured and the gas jets.

No reason is known why the sensing system of the present invention should be limited to the use of gases, so by "fluid" throughout this specification is meant both gases and liquids.

I claim:

1. A fluid operated gauge for indicating the degree of proximity of a workpiece to a nozzle part of the gauge from which issues a jet of fluid which strikes the workpiece, a change in a parameter of the fluid due to impedance of flow presented by the workpiece being used to gauge the distance of the workpiece from the nozzle, said nozzle being a duplex nozzle consisting of a first conduit having a first orifice and a second conduit having a second orifice, said first conduit being arranged to emit a jet of fluid coaxial with and surrounding said second conduit having said second orifice, common means supplying said first and second conduits with fluid under pressure flowing in a direction towards the workpiece, said second conduit having a pressure dropping restrictor therein, the flow of fluid through the first orifice forming a relatively high pressure fluid sleeve for containing the flow of relatively low pressure fluid through the second orifice, variations in the spacing between the workpiece and the nozzle varying a parameter of the fluid flow supplied to the second orifice and means for sensing the change in the parameter of the fluid supplied to said second orifice.

2. A fluid operated gauge as claimed in claim 1 wherein two duplex nozzles are provided with their jets coaxial and directed away from each other, the first conduit of both nozzles being connected in parallel to a conduit supplied with fluid under pressure and the second conduit of both nozzles being connected in parallel to a conduit supplied with fluid under pressure and to a sensing means.

3. A fluid operated gauge as claimed in claim 1 wherein two duplex nozzles are provided with their jets coaxial and directed toward each other, the first conduit of both nozzles being connected in parallel to a conduit supplied with fluid under pressure and the second conduit of both nozzles being connected in parallel to a conduit supplied with fluid under pressure and to a sensing means.

4. A fluid operated gauge for indicating the degree of proximity of a workpiece to a nozzle part of the gauge from which issues a jet of fluid which strikes the workpiece, a change in a parameter of the fluid due to impedance of flow presented by the workpiece being used to gauge the distance of the workpiece from the nozzle, said nozzle being a duplex nozzle consisting of a first conduit having a first orifice and a second conduit having a second orifice, said first conduit being arranged to emit a jet of fluid coaxial with and surrounding said second conduit having said second orifice, means supplying said first and second conduits with fluid under pressure flowing in a direction towards the workpiece, the flow of fluid through the first orifice forming a relatively high pressure fluid sleeve for containing the flow of relatively low pressure fluid through the second orifice, variations in the spacing between the workpiece and the nozzle varying a parameter of the fluid flow supplied to the second orifice and means for sensing the change in the parameter of the fluid supplied to said second orifice, means wherein the flow of fluid in the second conduit is adjustable relative to the flow in the first conduit, and means wherein the first orifice is adapted to emit a jet of fluid which converges outwardly of the nozzle to form a conical jet having its apex lying on the axis of the second orifice.

5. A fluid operated gauge as claimed in claim 4, wherein the sensing means is responsive to a difference between the pressure of fluid in the second conduit and a datum pressure.

6. A fluid operated gauge as claimed in claim 4, wherein the sensing means is a flow meter adapted to measure the rate of flow of fluid through a by-pass conduit in communication with said second conduit.

7. A fluid operated gauge as claimed in claim 6, and means wherein the first conduit and the second conduit are connected to a common source of fluid under pressure, a first flow restrictor being provided between the source and the second conduit, the source being in communication through a second flow restrictor with a nozzle having an adjustable discharge area, a manometer tube having one end in communication with the fluid flowing from the second flow restrictor to the adjustable nozzle and having its other end connected to the second conduit intermediate the first flow restrictor and the second orifice.

8. A fluid operated gauge as claimed in claim 4, wherein the sensing means is a transducer responsive to a change in a parameter of the fluid in the second conduit to generate an output signal to operate a secondary control system through a mechanical, pneumatic, hydraulic or electric servo-mechanism.

9. A fluid operated gauge as claimed in claim 8, and means wherein the first conduit and the second conduit are connected to a common source of fluid under pressure, a first flow restrictor being positioned intermediate the source and the second conduit, the source being in communication through a second flow restrictor with a nozzle having an adjustable discharge area, a flow meter being connected across the flow restrictors on the sides thereof remote from the source.

10. A fluid operated gauge as claimed in claim 9, wherein the first flow restrictor is variable.

References Cited

UNITED STATES PATENTS 3,213,670   10/1965   MacGeorge  ---------- 73—37.6
3,246,507    4/1966   Hyde  --------------- 73—37.5

LOUIS R. PRINCE, Primary Examiner

W. A. HENRY II, Assistant Examiner